(12) United States Patent
Tuoriniemi et al.

(10) Patent No.: US 7,191,343 B2
(45) Date of Patent: Mar. 13, 2007

(54) VOUCHER DRIVEN ON-DEVICE CONTENT PERSONALIZATION

(75) Inventors: Samuli Tuoriniemi, Oulu (FI); Jukka Parkkinen, Oulu (FI)

(73) Assignee: Nokia Corporation, Espoo (FI)

( * ) Notice: Subject to any disclaimer, the term of this patent is extended or adjusted under 35 U.S.C. 154(b) by 770 days.

(21) Appl. No.: 10/059,099

(22) Filed: Jan. 25, 2002

(65) Prior Publication Data

US 2003/0142828 A1 Jul. 31, 2003

(51) Int. Cl.
*G06F 11/30* (2006.01)
*G06F 7/04* (2006.01)
*H04L 9/00* (2006.01)
*G06F 1/00* (2006.01)
*G06K 19/07* (2006.01)

(52) U.S. Cl. .................. 713/193; 726/26; 380/277
(58) Field of Classification Search .......... 705/51, 705/57, 59; 713/193, 160; 380/201, 270, 380/247, 248, 250; 726/26

See application file for complete search history.

(56) References Cited

U.S. PATENT DOCUMENTS

| | | | | |
|---|---|---|---|---|
| 6,885,748 B1 * | 4/2005 | Wang | .................. | 380/201 |
| 2002/0157002 A1 | 10/2002 | Messerges et al. | | |
| 2005/0004875 A1 * | 1/2005 | Kontio et al. | .................. | 705/52 |

FOREIGN PATENT DOCUMENTS

| | | |
|---|---|---|
| FR | 2788649 | 7/2000 |
| GB | 1156017 | 6/2001 |
| WO | 0184282 | 11/2001 |

OTHER PUBLICATIONS

J.D. Hahn: "Workshop on Digital Rights Management", DRM-Workshop, Jan. 22-23, 2001, pp. 1-8, XP-002237363.

* cited by examiner

*Primary Examiner*—Matthew Smithers
*Assistant Examiner*—Courtney D. Fields

(57) ABSTRACT

A method and apparatus are provided for personalizing content on a mobile phone, device or terminal, as any other type of user equipment, instead of the personalization being performed by a network infrastructure device such as a voucher server. The mobile phone, device or terminal has a voucher-driven on-device content personalization module for personalizing the content based on information contained in a rights expression voucher that accompanies the content. The mobile phone, device or terminal personalizes the content without server-side support from the wireless network infrastructure. The rights expression voucher contains information that controls the content personalization in the device. When the device or terminal receives content with this kind of rights expression voucher, it starts personalization operation according to personalization information. This personalization operation can personalize content to the same "individuals" as the server-based personalization. In addition, the device-based personalization operation can use personalization information not known by the voucher server (for example, device specific hardware operations). The personalization can be made by the local encryption of the content encryption key.

29 Claims, 4 Drawing Sheets

Voucher-driven On-device
Content Personalization Technique

Figure 1: Voucher-driven On-device Content Personalization Technique

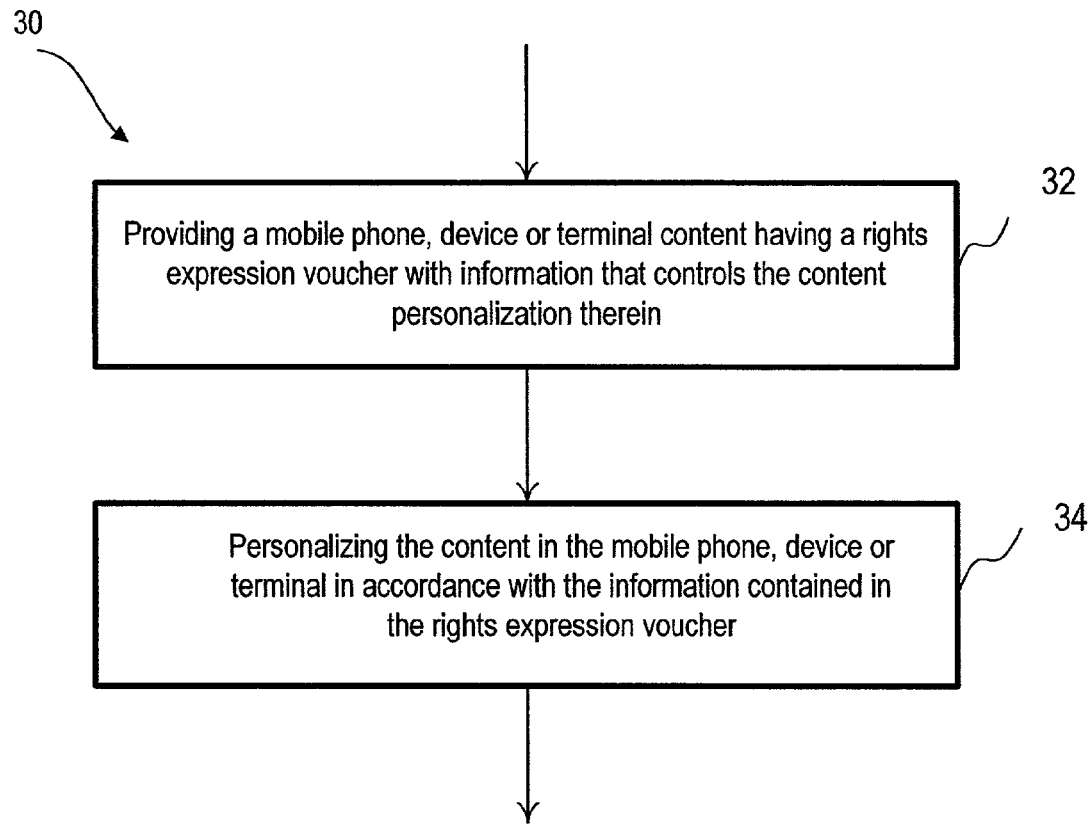
Figure 3: The Basic Steps of the Invention
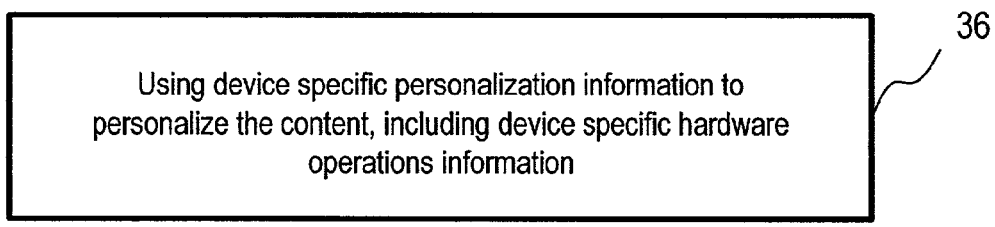
Figure 4: A Step for Personalizing

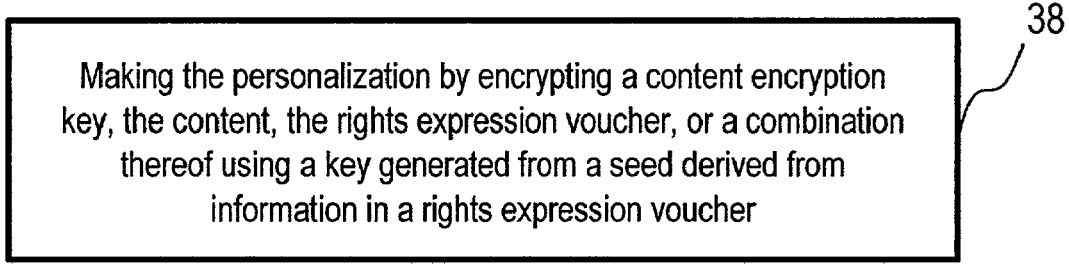
Figure 5: A Step for Personalization
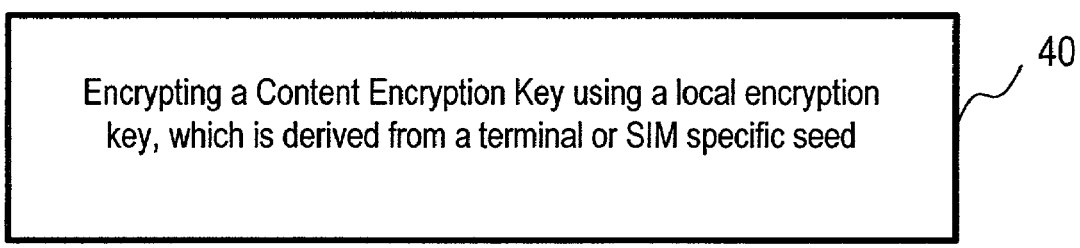
Figure 6: A Step for Personalization

VOUCHER DRIVEN ON-DEVICE CONTENT PERSONALIZATION

BACKGROUND OF THE INVENTION

1. Field of Invention

The present invention relates to a network; and more particularly relates to a network in which content is personalized by content creators or providers.

2. Description of Related Art

In a known Digital Rights Management (DRM) system, there is a voucher that expresses usage rights of the content. The voucher gives rights for using, copying, forwarding, saving, previewing, etc. The voucher is contained in a separate file.

The voucher may include a field which is used by the content provider for binding content usage rules to a specific device using, for example, the International Mobile Equipment Identity (IMEI) code of a phone, a device identifier (ID), etc. This is called content targeting or content personalization. Content is personalized by the content provider when generating the voucher (i.e. the value of the field is set).

Operators want somehow to personalize content, for example, to a specific Subscriber Identity Module (SIM) and thus limit content usage to that SIM. However, known personalization systems are all server-based and the problem with these systems has been typically solved with expensive hardware (HW) or some software (SW) based systems, which are not necessarily safe. Moreover, the known server-based content personalization is not possible until there are proper download and key exchange protocols. The known server-based systems also need complex encryption schemes and protocols and also put an extra load on the network (when exchanging keys) and the content service provider.

SUMMARY OF INVENTION

In its broadest sense, the present invention provides a new and unique method and apparatus for personalizing content on a mobile phone, device or terminal, as any other type of user equipment, instead of the personalization being performed by a network infrastructure device such as a voucher server. The mobile phone, device or terminal has a voucher-driven on-device content personalization module for personalizing the content based on information contained in a rights expression voucher that accompanies the content. The mobile phone, device or terminal personalizes the content without server-side support from the network infrastructure. After personalization, the content is not usable if the device used for personalization is not available; and the personalized content can only be used in common with that device. The present invention makes this kind of functionality possible without server-side support from the network infrastructure.

In operation, the mobile phone, device or terminal provides content personalization instead of a voucher server in the network. The rights expression voucher contains information that controls the content personalization in the device. When the device receives content with this kind of rights expression voucher, it starts personalization operation according to personalization information. This personalization operation can personalize content to the same "individuals" as the server-based personalization. In addition, the device-based personalization operation can use personalization information not known by the voucher server (for example, device specific hardware operations).

The personalization can be made by a local encryption of a Content Encryption Key (CEK), the content, the rights expression voucher itself, or a combination thereof, which may be encrypted using a key generated from a seed derived from information in the rights expression voucher, or may alternatively be encrypted using a device specific hardware function derived from information in the rights expression voucher. The local encryption key is preferably not stored in the mobile phone, device or terminal. Instead, the local CEK encryption key is regenerated from the same seed when needed. This ensures that the content cannot be used if the seed for the key is not present.

With the present invention, the content provider may describe to which device the content will be personalized. The options may include, for example, the SIM or any other type of smart card or external, terminal connected module, IMEI, some terminal hardware (HW) function, the rights expression voucher itself, a terminal secret key, an application specific circuit (ASIC) or a hardware identifier (ID), or any other fixed value from the device.

The rights expression voucher has a field that provides the device or terminal with a method and possible parameters, for example, information about the seed for the local encryption key, which are used for the local encryption of the CEK, the content, the rights expression voucher itself or a combination thereof. In other words, the rights expression voucher provides information about how the content is to be bound to the device. For example, it provides the information: "use IMEI code as a seed." In contrast, it does not provide the IMEI itself. Alternatively, it can provide just the encryption method: "encrypt this using HW function X in the device," and optionally provide some parameters to that HW function, e.g. the seed. In the device, either a HW or SW implementation module encrypts the CEK according to instructions described in the rights expression voucher (e.g., by using the encryption key generated from the seed described in the rights expression voucher, or using a device specific HW function described in the rights expression voucher), alternatively encrypts the whole content (not just the CEK) in a similar way.

The device to which the content is bound is not necessarily only the personalizing device itself, but may also be any other device coupled to the personalizing device, such as a SIM or any other type of terminal connected module.

One advantage of the present invention is that it does not need complex encryption schemes and protocols.

Another advantage of the present invention is that it solves the problem concerning the storage of the decryption key. When the key itself is not stored at all it is impossible to copy it into some other device.

Another advantage of the present invention is that the content creator or provider can make decisions regarding the personalization of content without negotiating with the party that is delivering the personalized content to the end user, or with the party that is receiving the content.

Another advantage of the present invention is that it off-loads considerable data processing related to personalization from the voucher servers to devices.

Another advantage of the present invention is that it adds additional security because the content specific CEK is encrypted.

BRIEF DESCRIPTION OF THE DRAWING

The drawing, not drawn to scale, includes the following Figures:

FIG. 3 is a diagram of a flow chart of the basic steps of the present invention.

FIGS. 4–6 show steps for personalizing the content in the flowchart shown in FIG. 3.

DETAILED DESCRIPTION OF INVENTION

Figure 1:
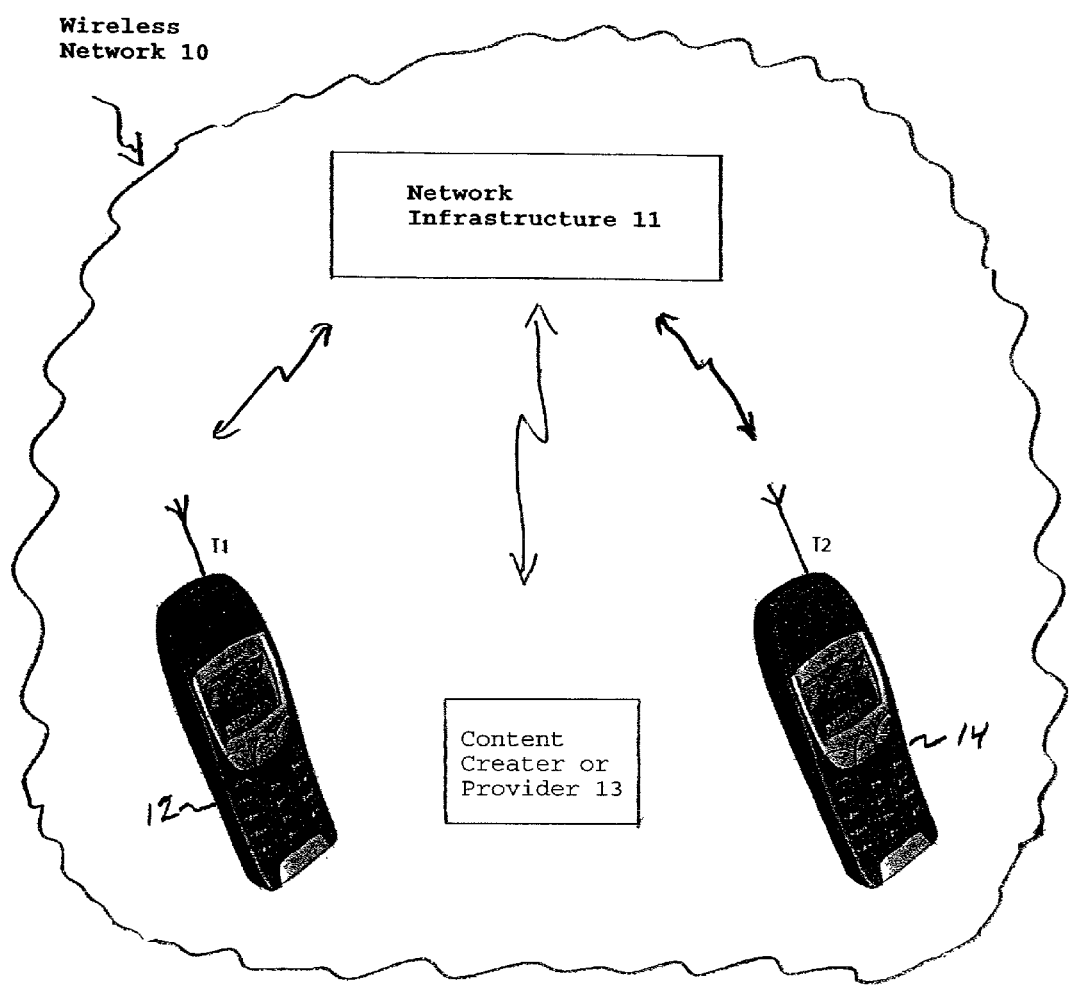
FIG. 1 is a diagram of a wireless network having a network infrastructure and two terminals that forms the subject matter of the present invention.

FIG. 1: The Basic Invention

FIG. 1 shows a wireless network generally indicated as 10 having a network infrastructure 11, a first wireless phone, terminal or device 12, a content creator or provider 13 and a second wireless phone, terminal or device 14. Although the invention is described by way of example in relation to the wireless network 10, the scope of the invention is also intended to include non-wireless networks.

According to the present invention, in the wireless network 10 the wireless recipient 12 or 14 personalizes content received from the content creator or provider 13 instead of the personalization being performed by a network infrastructure device such as a voucher server. The personalization of the content is based on information contained in a rights expression voucher that accompanies the content. The rights expression voucher contains information that controls the content personalization by the device 12 or 14. When the mobile phone, device or terminal 12, 14 receives content with this kind of rights expression voucher, it starts personalization operation according to the personalization information contained therein. The mobile phone, device or terminal 12, 14 provides the content personalization instead of a voucher server in the wireless network infrastructure 11. After personalization, the content is not usable if the device used for personalization is not available; and the personalized content can only be used in common with that device.

FIG. 2

Figure 2:
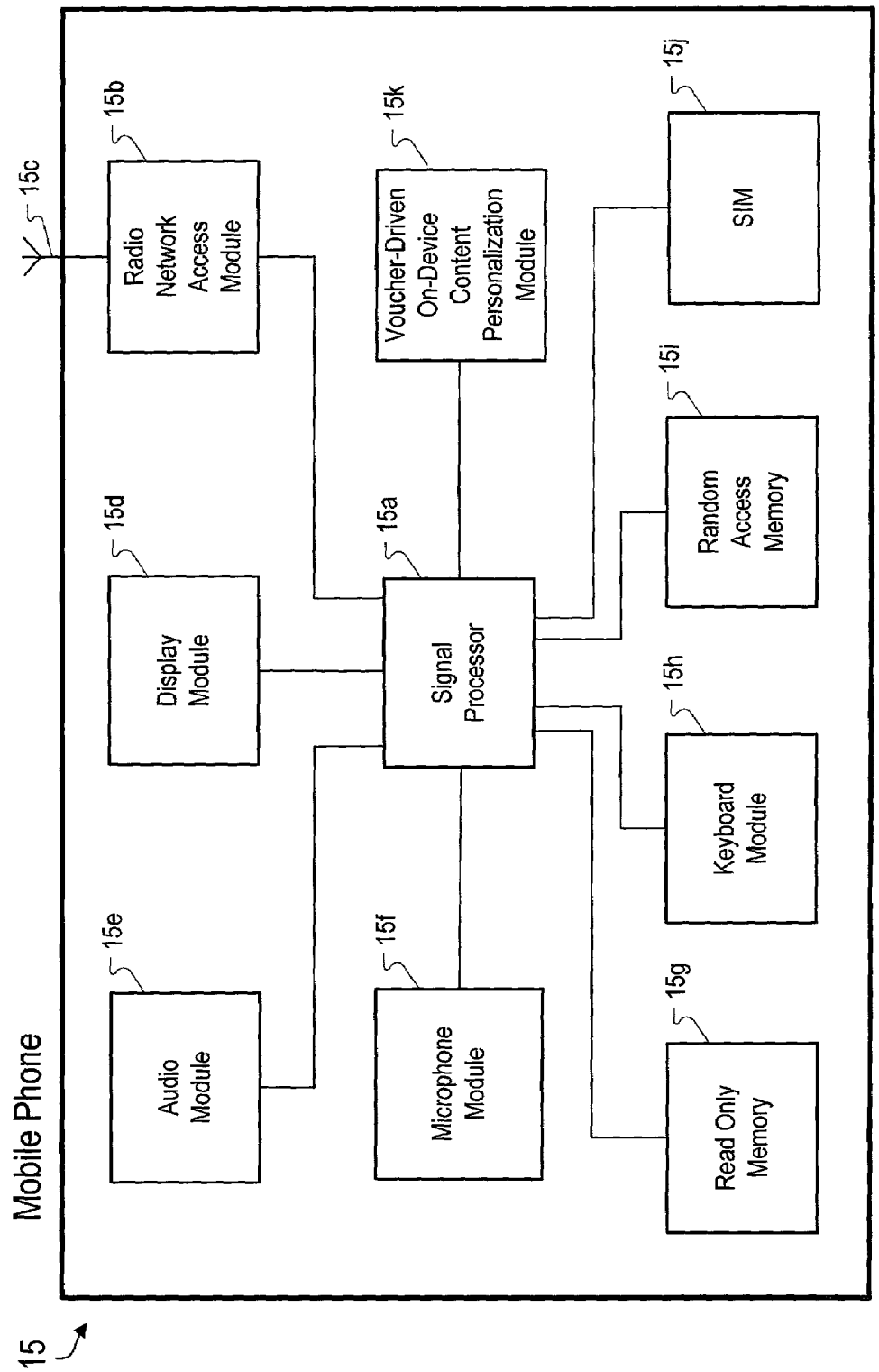
FIG. 2 is a block diagram of a wireless terminal that forms the subject matter of the present invention.

FIG. 2 shows a block diagram of a wireless phone, device or terminal 15, like the wireless sender 12 or the wireless recipient 14. The wireless device 15 includes a signal processor 15a connected to a radio access network module 15b (connected to an antenna 15c), a display module 15d, an audio module 15e, a microphone 15f, a read only memory 15g (ROM or EPROM), a keyboard module 15h, a random access memory 15i (RAM) and a SIM 15j. The signal processor 15a controls the operation of wireless terminal 15, the operation of which is known in the art. Moreover, the scope of the invention is not intended to be limited to any particular kind or type of the aforementioned elements 15a, 15b, . . . , 15j. For example, the scope of the invention is intended to include the radio access network module 15b being either an antenna module, a radio frequency (RF) module, a radio modem or the like. The wireless terminal 15 may also include many other circuit elements known in the art which are not shown or described.

The wireless device 15 features a voucher-driven on-device content personalization module 15k for providing content personalization instead of the voucher server in the wireless network infrastructure 11 (FIG. 1). The voucher-driven on-device content personalization module 15k may be implemented using hardware, software, or a combination thereof. The module can be implemented either inside the device 15, or in an outside module, e.g. in a smart card. In a typical software implementation, the voucher-driven on-device content personalization module 15k would be a microprocessor-based architecture having a microprocessor, a random access memory (RAM), a read only memory (ROM), input/output devices and control, data and address buses connecting the same. A person skilled in the art of programming would be able to program such a microprocessor-based implementation to perform the steps discussed above, as well as the steps discussed below, without undue experimentation. The most typical implementation of such a module would be as a part of a Digital Rights Management (DRM) engine. The DRM engine and its functionality for controlling digital rights are well known to the person skilled in the art.

FIGS. 3–6

FIG. 3 shows a flow chart having basic steps generally indicated as 30 of the voucher-driven on-device content personalization that is the subject matter of the present invention. The method includes two important steps:

In a first step 32, the mobile phone, device or terminal 12, 14 in FIG. 1 is provided content having a rights expression voucher with information that controls the content personalization therein. The content creator or provider 13 (FIG. 1) typically provides the content.

In a second step 34, the voucher-driven on-device content personalization module 15k in FIG. 2 of the mobile phone, device or terminal in FIG. 1 personalizes the content instead of the personalization being performed by the network infrastructure device 11 (FIG. 1) such as a voucher server. The personalization of the content is based on information contained in the rights expression voucher.

In order to personalize the content, by way of example, the voucher-driven on-device content personalization module 15k may do the following:

FIG. 4 shows a step 36, wherein the voucher-driven on-device content personalization module 15k personalizes content by using personalization information not known by the voucher server (for example, device specific hardware operations) to personalize the content.

FIG. 5 shows a step 38, wherein the voucher-driven on-device content personalization module 15k personalizes content by encrypting the content encryption key, the content, the rights expression voucher, or a combination thereof using a key generated from a seed derived from information in the rights expression voucher.

FIG. 6 shows a step 40, wherein the voucher-driven on-device content personalization module 15k personalizes content by encrypting the CEK using the information contained in the rights expression voucher about a terminal or SIM specific seed for the local encryption key.

The voucher-driven on-device content personalization module 15k may use any one or a combination of the aforementioned steps. The scope of the invention is intended to include any personalization scheme known in the art, and is not intended to be limited to how the content is personalized by the voucher-driven on-device content personalization module 15k in the mobile phone, device or terminal 12, 14 in FIG. 1.

In the present invention, the local CEK encryption key is not stored in the mobile phone, device or terminal 12, 14; instead, the local CEK encryption key is regenerated, when needed, using the same information in the rights expression voucher used to determine the content personalization, to ensure that the content cannot be used if the device used for personalization is not present.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A method for personalizing content in a network having a network infrastructure, wherein a mobile device receives content having a rights expression voucher attached thereto and personalizes the content based on information contained in the rights expression voucher that accompanies the content.

2. A method according to claim 1, wherein the step of personalizing includes encrypting a content encryption key using a local encryption key, which is derived from a terminal or subscriber identity module specific encryption seed.

3. A method according to claim 1, wherein the step of personalizing includes regenerating a local encryption key from the same encryption seed when needed, instead of storing the local encryption key, to ensure that the content cannot be used if the same encryption seed for the local encryption key is not present.

4. A method according to claim 1, wherein the personalizing includes using a tag contained in a rights expression voucher, the tag providing the wireless device or terminal a specific encryption seed for a key which is used for the local encryption of the content encryption key.

5. A method according to claim 4, wherein in the wireless device or terminal either a hardware or software implementation module is used to generate the key and encrypts the content encryption key using a terminal or subscriber identity module specific seed, which is provided in the rights expression voucher.

6. A method according to claim 1, wherein the personalizing includes using information related to either subscriber identity module, international mobile equipment identity, some terminal hardware function or the rights expression voucher.

7. A method tar personalizing content in a network, wherein the method comprises:
providing a mobile device content having a rights expression voucher attached thereto with information that controls the content personalization therein; and
personalizing the content in the device in accordance with the information contained in the rights expression voucher.

8. A method according to claim 7, wherein the personalizing includes using device specific personalization information to personalize the content, including device specific hardware operations information.

9. A method according to claim 7, wherein the personalizing includes making the personalization by the local encryption of the content encryption key.

10. A method according to claim 7, wherein the personalizing includes encrypting the content encryption key using a local encryption key, which is derived from a terminal or SIM specific seed.

11. A mobile device for operating in a network having a network infrastructure, wherein the mobile device comprises a voucher-driven on-device content personalization module for receiving content having a rights expression voucher attached thereto and personalizing the content based on information contained in the rights expression voucher that accompanies the content.

12. A mobile device according to claim 11, wherein the voucher-driven on-device content personalization module uses personalization information, including device specific hardware operations, to personalize the content.

13. A mobile device according to claim 11, wherein the voucher-driven on-device content personalization module makes the personalization by a local encryption of a content encryption key.

14. A mobile device according to claim 11, wherein the voucher-driven on-device content personalization module encrypts a content encryption key using a local encryption key, which is derived from a terminal or subscriber identity module specific seed.

15. A network having a mobile device and a network infrastructure, wherein the mobile device comprises a voucher-driven on-device content personalization module for receiving content having a rights expression voucher attached thereto and personalizing the content based on information contained in the rights expression voucher that accompanies the content.

16. A network according to claim 15, wherein the voucher-driven on-device content personalization module uses personalization information, including device specific hardware operations, to personalize the content.

17. A network according to claim 15, wherein the voucher-driven on-device content personalization module encrypts a content encryption key using a local encryption key, which is derived from a terminal or subscriber identity module specific seed.

18. A method according to claim 1, wherein the personalizing includes encrypting the content or the rights expression voucher itself using a key generated from a seed derived from information in a rights expression voucher.

19. A method according to claim 1, wherein the personalizing includes encrypting a content encryption key, the content, the rights expression voucher itself or a combination thereof, including using a device specific hardware function described in the rights expression voucher.

20. A method according to claim 4, wherein the field provides a method which is used for the local encryption of the content encryption key, the content, the rights expression voucher itself or a combination thereof.

21. A method according to claim 1, wherein the personalizing includes using a field contained in a rights expression voucher, the field providing the device, a device specific function which is used for the local encryption of a content encryption key.

22. A method according to claim 7, wherein the personalizing includes encrypting a content encryption key, the content, the rights expression voucher, or a combination thereof, including using a device specific function derived from information in the rights expression voucher.

23. A mobile device according to claim 11, wherein the voucher-driven on-device content personalization module encrypts a content encryption key, the content, the rights expression voucher, or a combination thereof, including using a device specific function derived from information in the rights expression voucher.

24. A network according to claim 15, wherein the voucher-driven on-device content personalization module encrypts a content encryption key, the content, the rights expression voucher, or a combination thereof, including using a device specific function derived from information in the rights expression voucher.

25. A method according to claim 1, wherein the device to which personalized content is bound includes not only the device itself, but also other devices coupled to the device.

26. A method according to claim 1, wherein the personalization is made by a local encryption of a content encryption key (CEK), the content, the rights expression voucher, or some combination thereof.

27. A method according to claim 7, wherein the personalization is made by a local encryption of a content encryption key (CEK), the content, the rights expression voucher, or some combination thereof.

28. A mobile device according to claim 11, wherein the personalization is made by a local encryption of a content encryption key (CEK), the content, the rights expression voucher, or some combination thereof.

29. A network according to claim 15, wherein the personalization is made by a local encryption of a content encryption key (CEK), the content, the rights expression voucher, or some combination thereof.

* * * * *

UNITED STATES PATENT AND TRADEMARK OFFICE
CERTIFICATE OF CORRECTION

| | | |
|---|---|---|
| PATENT NO. | : 7,191,343 B2 | Page 1 of 1 |
| APPLICATION NO. | : 10/059099 | |
| DATED | : March 13, 2007 | |
| INVENTOR(S) | : Samuli Touriniemi and Jukka Parkkinen | |

It is certified that error appears in the above-identified patent and that said Letters Patent is hereby corrected as shown below:

Column 5, line 53, claim 7, line 1 "tar" should be -- for --

Signed and Sealed this

Eighteenth Day of September, 2007

JON W. DUDAS
*Director of the United States Patent and Trademark Office*